C. CELENE.
VERMIN TRAP.
APPLICATION FILED JAN. 3, 1913.
1,081,363.
Patented Dec. 16, 1913.
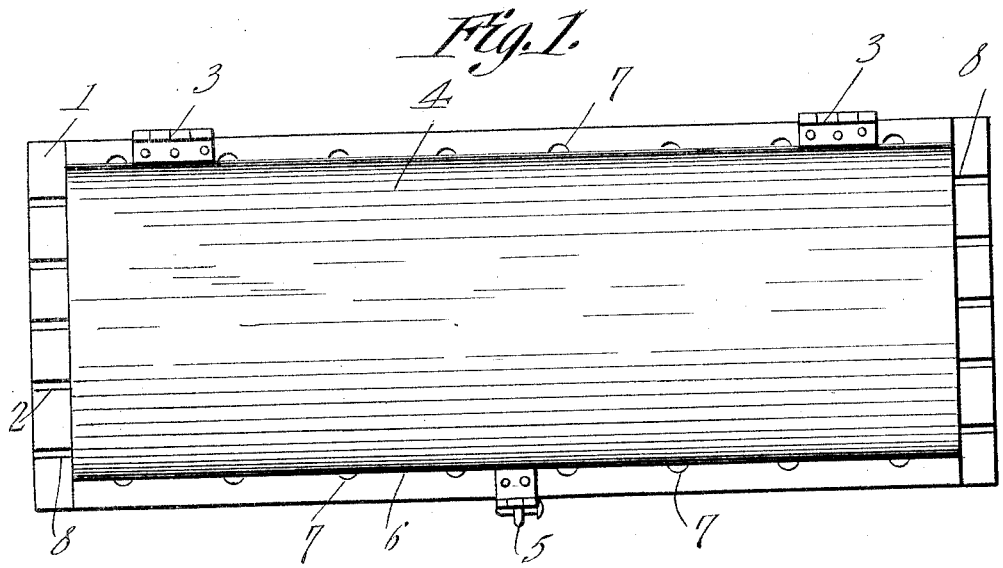
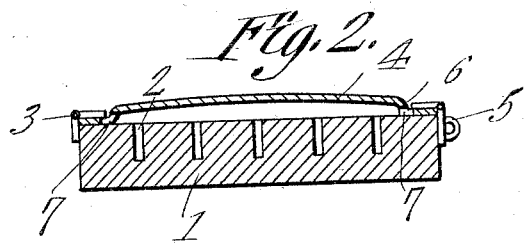
Witnesses
Charles Celene
Inventor
by C. A. Snow & Co.
Attorneys

UNITED STATES PATENT OFFICE.

CHARLES CELENE, OF PORT ORCHARD, WASHINGTON, ASSIGNOR OF ONE-HALF TO MAMIE AUBURN, OF SEATTLE, WASHINGTON.

VERMIN-TRAP.

1,081,363.  Specification of Letters Patent.  Patented Dec. 16, 1913.

Application filed January 3, 1913. Serial No. 740,061.

*To all whom it may concern:*

Be it known that I, CHARLES CELENE, a citizen of the United States, residing at Port Orchard, in the county of Kitsap and State of Washington, have invented a new and useful Vermin-Trap, of which the following is a specification.

The device forming the subject matter of this application is adapted to be employed in the taking of various nocturnal vermin, such as the *Cimex lectularius*, which commonly infest buildings and furniture. Insects of this sort seek shelter, upon the coming of light, in grooves and cracks from which they are dislodged with difficulty if at all.

This invention aims to provide a trap into which the vermin will readily flee from shelter, the construction being such, that, although a shelter is provided, in which the vermin will remain, the device may readily be emptied and cleaned.

It is within the scope of the invention to improve generally and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing: Figure 1 shows the invention in plan; and Fig. 2 is a transverse section.

In carrying out the invention there is provided a base 1 which preferably is fashioned from wood. The base 1 is provided in its upper surface with a plurality of longitudinally extended grooves 2. By means of hinges 3 a cover 4 is connected to one of the longitudinal edges of the base 1. Latch mechanism 5 of any desired sort serves to connect the free edge of the cover 4 with the base 1. Adjacent its longitudinal edges, the cover 4 is provided with upstanding shoulders 6 in which there are openings 7. The grooves 2 extend, as indicated at 8, beyond the ends of the cover 4.

In practical operation, the device, arranged as shown in the drawings, is placed in some locality which is infested by vermin. The vermin, following their natural instincts, will enter the grooves 2 and hide beneath the cover 4. The entrance of the vermin into the trap may take place through the openings 7. Owing to the fact that the ends of the grooves 2 protrude as indicated at 8 beyond the ends of the cover 4, the ends of the grooves will at all times be visible and the vermin will readily enter the grooves at the ends of the grooves, passing thence into hiding beneath the cover 4. In order to empty the trap, the same is disposed endwise and in a vertical position, and is tapped at one end; or the structure may be inverted bodily, from the position shown in Fig. 2, and be tapped, whereupon the vermin, lodged in the grooves 2 will fall upon the cover 4. The cover 4 preferably is fashioned from tin, and the vermin, therefore, cannot acquire a foot hold upon the cover, the cover acting as a chute whereby the vermin may be discharged from the trap. The cover 4 is of special importance. When the trap is inverted from the position shown in Fig. 2, or is placed vertically, the vermin will readily leave the grooves 2, because the major portions of the grooves are housed beneath the cover 4. The vermin, therefore, will offer no marked resistance to leaving the grooves 2, the cover 4 creating the impression that a sure retreat is provided, even though the vermin leave the grooves 2. The vermin, therefore, will not cling in the grooves 2, but will pass out readily upon the cover 4 when the structure is inverted or is stood end-wise. The cover 4 may be swung back, to permit a complete and thorough cleaning of the structure.

Having thus described the invention, what is claimed is:—

A vermin trap comprising a base; and a cover including flanges resting on top of the base and a body spaced from the base, the cover being shorter than the base to define, with the flanges, a marginal platform surrounding the body; the base having a longitudinal groove in its upper face and extended from one end of the base to the other, there being a vertical opening in each flange, the openings communicating with the space beneath the body, the ends of the groove and the openings constituting vermin-intercepting apertures in the marginal platform.

In testimony that I claim the foregoing as my own, I have hereto affixed my signature in the presence of two witnesses.

CHARLES CELENE.

Witnesses:
 GEO. E. MILLER,
 W. E. PITCHER.

Copies of this patent may be obtained for five cents each, by addressing the "Commissioner of Patents, Washington, D. C."